Aug. 18, 1959   J. L. WILSON   2,899,889
FRYING DEVICE
Filed March 12, 1958   2 Sheets-Sheet 1
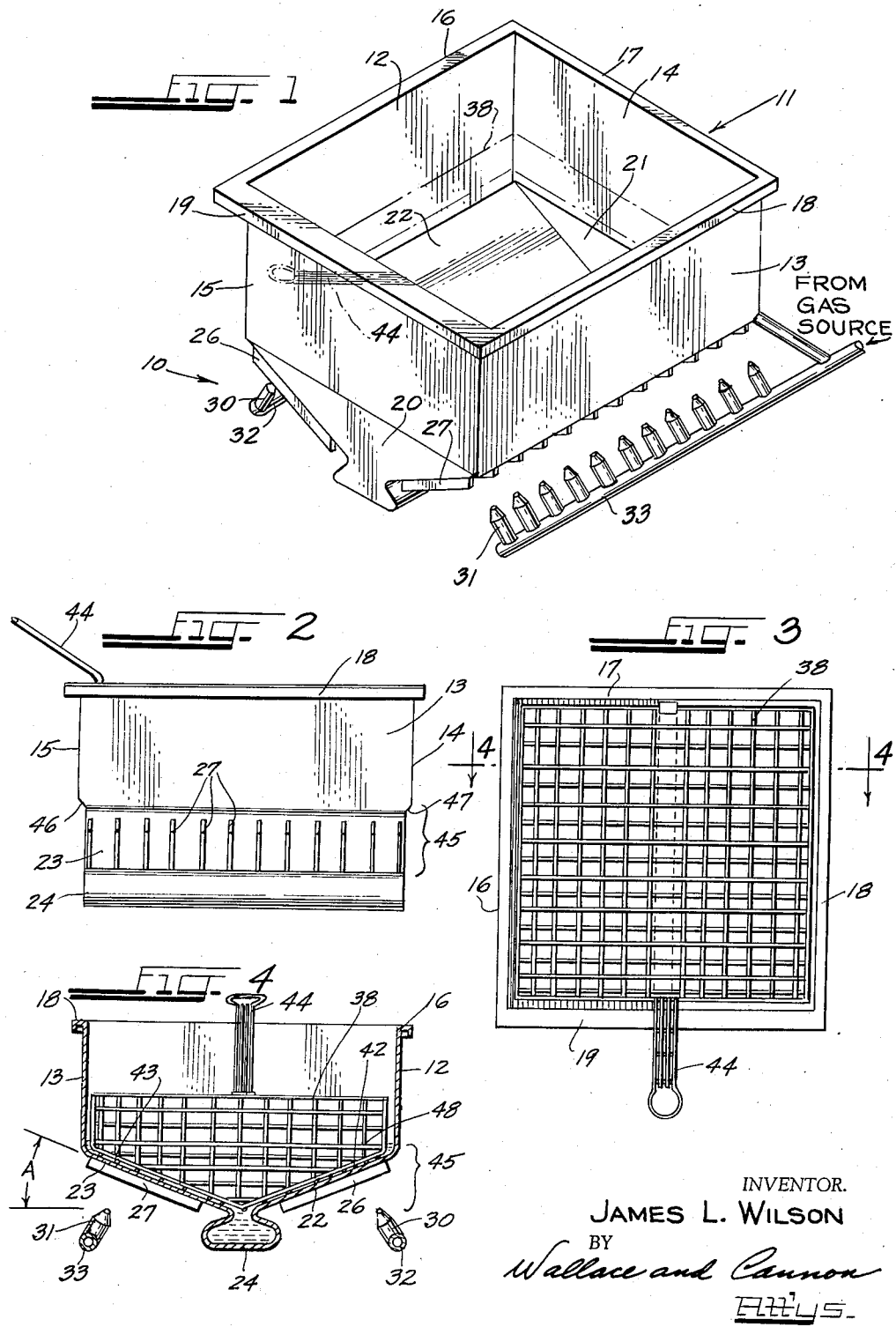
INVENTOR.
JAMES L. WILSON
BY
Wallace and Cannon
ATTYS.

Aug. 18, 1959   J. L. WILSON   2,899,889
FRYING DEVICE
Filed March 12, 1958   2 Sheets-Sheet 2
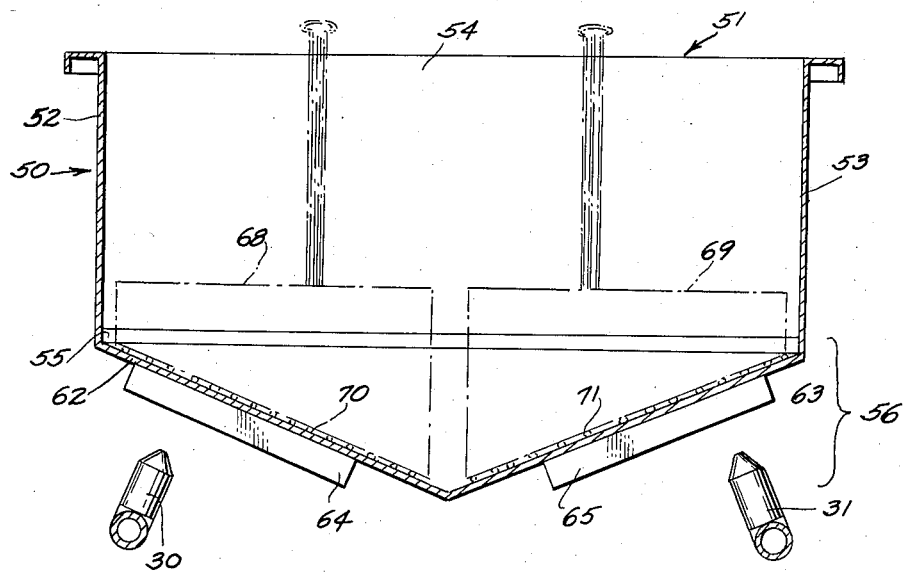
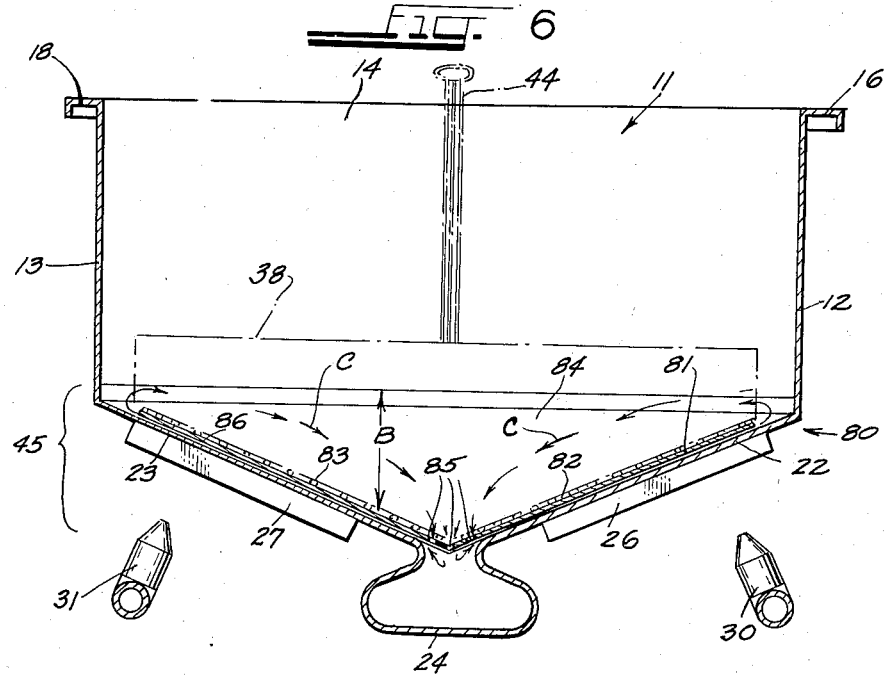
INVENTOR.
JAMES L. WILSON
BY
Wallace and Cannon
Attys.

United States Patent Office 2,899,889
Patented Aug. 18, 1959

2,899,889
FRYING DEVICE

James L. Wilson, Chicago, Ill., assignor to Wilson Metal Products, Inc., Chicago, Ill., a corporation of Illinois Application March 12, 1958, Serial No. 720,866

6 Claims. (Cl. 99—408)

This invention relates to a new and improved frying device and more particularly to a deep-fat fryer construction which inherently minimizes foaming of the grease or fat used for frying.

One of the most difficult continuing problems presented by deep-fat fryers relates to foaming of the cooking oil or fat during the frying operation. When a deep-fat fryer is first placed in service or when the cooking oil or other fat is completely replaced within the fryer, little or no foaming occurs during the frying operation. With continued use, however, the cooking oil or fat changes, with the result that progressively increasing foaming action takes place. This foaming is apparently due ot absorption of water into the cooking fat as a result of contact with the food during the frying operation.

In conventional deep-fat frying devices, this foaming action presents very substantial difficulties, since the fat frequently foams over the sides of the frying device. When this occurs a definite fire hazard is presented in addition to the unsanitary conditions presented and the difficulty of cleaning up the grease or fat. The foaming action may be controlled to some extent by limiting the amount of food placed in the fryer during each frying operation but this expedient results in a marked decrease in the efficiency of the fryer. It is also possible to make the grease receptacle extremely deep but an arrangement of this kind merely delays the undesirable effect of the foaming and also makes the fryer more awkward to use.

The principal object of the invention, therefore, is a new and improved deep-fat fryer which inherently minimizes or eliminates the above-described foaming effect.

A further object of the invention is a new and improved deep-fat frying device which provides for a substantial reduction in foaming yet does not require an excessively deep or otherwise awkward grease receptacle.

Another object of the invention is a new and improved deep-fat frying device suitable for gas, electrical, or other heating and which effectively eliminates the difficulties and problems normally presented by foaming of the heated fat.

A further object of the invention is a new and improved deep-fat frying device in which any foaming of the grease or fat is substantially independent of the amount of food being fried.

An additional object of the invention is a new and improved deep-fat frying device which inherently minimizes foaming yet is essentially simple and economical in construction.

Another object of the invention is a new and improved deep-fat frying device which inherently reduces foaming without regard to the type of cooking oil or grease utilized in the fryer.

Other and further objects of the present invention will be apparent from the following description and claims and are illustrated in the accompanying drawings which, by way of illustration, shows preferred embodiments of the present invention and the principles thereof and what is now considered to be the best mode for applying those principles. Other embodiments of the invention embodying the same or equivalent principles may be used and structural changes may be made as desired by those skilled in the art without departing from the present invention.

In the drawings:

Fig. 1 is a perspective view of a deep-fat frying device constructed in accordance with one embodiment of the invention;

Fig. 2 is a side elevation of the deep-fat fryer illustrated in Fig. 1, the heating elements having been omitted from this figure;

Fig. 3 is a plan view of the deep-fat fryer of Fig. 1;

Fig. 4 is a sectional view of the deep-fat fryer taken along line 4—4 in Fig. 3;

Fig. 5 is a sectional view similar to Fig. 4 of another embodiment of the invention; and Fig. 6 is a sectional view of a further embodiment of the invention.

The deep-fat frying device 10 illustrated in Fig. 1 comprises a grease receptacle 11 having four substantially vertical side walls 12, 13, 14 and 15. The side walls 12 and 13 are located at opposite sides of the receptacle and the side walls 14 and 15 are similarly opposed to each other. Preferably, the walls 12, 13, 14 and 15 are provided with flanges 16, 17, 18 and 19 along their upper edges to provide for convenient mounting of the receptacle in a suitable cabinet; one of the flanges such as the flange 19 may be made somewhat different in dimensions from the other flanges to insure proper orientation of the receptacle 11 within a cabinet, although this is not essential.

The grease receptacle 11 also includes a base or bottom wall portion comprising two substantially vertical end walls 20 and 21 and a pair of bottom walls 22 and 23 (see Fig. 4). The bottom walls 22 and 23 extend downwardly and inwardly from the opposed side walls 12 and 13, respectively, and are inclined at an angle A with respect to the horizontal. The angular inclination of the bottom walls 22 and 23 is highly critical with respect to the present invention. Preferably, the angle A is made approximately equal to 21° and should be held within a critical range of 18° to 23° with respect to the horizontal.

In the embodiment illustrated in Figs. 1–4 the two bottom walls 22 and 23 do not meet at the center of the grease receptacle 11; rather, they funnel into a sediment trap 24 which is located at the center of the bottom portion of the receptacle 11. The bottom wall 22 is preferably provided with a plurality of heat-conducting fins 26 disposed at spaced intervals along the length thereof and a similar plurality of heat-conducting fins 27 are preferably mounted along the undersurface of the bottom wall 23. The entire grease receptacle 11 and the sediment trap 24 may be constructed from enameled steel, plated steel or other suitable material. Preferably, however, this portion of the frying device is constructed entirely from stainless steel in order to minimize cleaning problems with respect thereto.

Heating of the grease receptacle 11 may be accomplished in any convenient manner. Thus, for example, a set of gas heating jets 30 connected to a manifold 32 may be located beneath the bottom wall 22 and the heat conducting fins 26 of the grease receptacle. A similar set of gas heating jets 31 connected to a manifold 33 may be located underneath the bottom wall 23 of the frying device. The two manifolds 31 and 33 may be connected to each other and to a suitable source of heating gas. On the other hand, suitable electrical heating coils (not shown) may be used to heat the grease receptacle 11 in the usual manner. It should be understood that either a gas heating arrangement such as the jets 30 and 31 or electrical heating coils may be utilized in the deep fat frying device 10; on the other hand, in some applications it may be desirable to provide both types of heating device in a single frying unit.

The deep-fat frying device 10 further includes a wire mesh basket 38 which is utilized to suspend food within the grease receptacle 11 in order to fry the food. The basket 38 is relatively shallow in depth and is essentially similar in configuration to the base portion of the grease receptacle 11. Thus, and as best illustrated in Fig. 4, the bottom or base portion of the basket 38 comprises a pair of bottom walls 42 and 43 which are disposed directly over and extend approximately parallel to the bottom walls 22 and 23 of the grease receptacle 11 when the basket is located in operating position. The basket 38 is provided with a suitable handle 44 which may be utilized to raise and lower the basket to and from the operating position shown in Figs. 1, 3 and 4. The use of a relatively shallow basket is highly desirable in that it limits the height to which food may be stacked within the basket and therefore assures proper operation of the deep fat frying device 10 as described more fully hereinafter.

When the deep fat frying device 10 is to be placed in operation, the lower portion or frying section 45 of the grease receptacle 11 is filled with a suitable grease or cooking oil; if the fat employed is solid at room temperature the receptacle may be heated to assure even distribution and to assist in determining the level to which it has been filled. It should be noted that the frying section 45 is relatively shallow in depth and that the depth of this section varies substantially because of the slope of the inclined bottom walls 22 and 23. Preferably, the end walls 14 and 15 of the upper portion of the grease receptacle are provided with stepped portions 46 and 47, respectively, to permit the cook to fill the receptacle with grease approximately with the level indicated in Figs. 1-4 by the dash lines 48. Optimum operation of the deep-fat fryer 10 is to some extent dependent upon the depth of the cooking oil or grease; the level indicated by the dash line 48 may be exceeded by as much as one-half to three-fourths inch, but substantially greater quantities of oil or fat may lead to a marked reduction in the anti-foaming characteristics of the fryer.

After the receptacle 11 has received a suitable charge of cooking oil or other cooking fat, the fryer is ready for operation. Food to be fried is placed in the basket 38 in the usual manner, the grease receptacle 11 is heated by either one or both of the aforementioned gas and electrical heating devices, and the basket is lowered into its operating position, thereby immersing the food within the frying section 45 of the fryer. Of course, some of the food may extend above the level 48 but will still be cooked, since the food displaces a substantial portion of cooking oil or fat and since the heating of the fat and the presence of the food within the receptacle 11 causes substantial circulation of the heated fat due to boiling action and turbulence.

Continued operation of the frying device 10 is substantially as described above. Of course, it may be necessary for the cook to replenish the supply of cooking oil or fat to some extent as use continues, since a certain portion of the fat is removed with each cooking operation. The important aspect of this continuing operation is that the frying device 10 does not exhibit the excessive foaming, after a substantial period of use, which is characteristic of previously known deep-fat fryers. Some foaming of course takes place with continuing operation, but this foaming is extremely limited in nature as compared with that present in previously known fryers. Indeed, the foaming does not present any particular problem and is so small as to permit continued use of the fryer until the cooking oil or fat is rancid or is so filled with food particles and other sediment as to be unusable. Stated differently, the frying device 10 minimizes foaming to such an extent that it no longer presents a limitation upon use of the cooking oil or fat and affords greatly extended life for the cooking oil, in this regard, as compared with previously known devices. Moreover, the foaming action in the frying device 10 is substantially independent of the quantity of food fried at any one time; the basket 38 may be filled completely or may be loaded with only a small quantity of food without materially affecting the amount of foaming action. During continued use of the fryer, of course, sediment from the cooking operations collects in the trap 24, which must eventually be cleaned out.

The deep-fat frying device 10 is extremely simple and economical in construction and indeed is substantially similar to previously known fryers except for the critical configuration of the bottom portion or frying section 45 of the grease receptacle 11, the shape of the basket 38 relative to the receptacle, and the disposition of the basket within the frying section of the receptacle. To date, no satisfactory theory has been developed to explain the marked change in foaming afforded by the invention. It has been discovered, however, that the effective angle of inclination of the bottom walls of the grease receptacle (angle A in Fig. 4) is critical and must be held within the range of 18° to 23°. Thus, if this angle is made as large as 23° virtually no reduction in foaming action is achieved as compared with a substantially flat bottom receptacle. By the same token, any substantial decrease in the angle below 18° results in a complete loss of the desired anti-foaming effect. There are even some variations within the critical range and the angle of approximately 21° has been found to afford optimum operation with respect to reduction of foaming.

Fig. 5 illustrates another embodiment of the invention which in most respects is substantially similar to the frying device 10 of Figs. 1-4. Thus, the deep-fat fryer 50 illustrated in Fig. 5 comprises a grease receptacle 51 having substantially vertical side walls 52 and 53. The end walls of the grease receptacle 51 are also preferably substantially vertical as indicated by the one end wall 54 shown in this sectional view. Preferably, the end wall 54 is stepped or otherwise constructed to afford a clear indication of the desired grease level in the receptacle, as for example by the step indicated by reference numeral 55.

The base portion or frying section 56 of the grease receptacle 51 comprises a pair of bottom walls 62 and 63 which are inclined inwardly from the side walls 52 and 53 at an angle of approximately 21° from the horizontal. The bottom walls 62 and 63 may be provided with suitable heat conducting fins 64 and 65, respectively. Heat for the grease receptacle 51 may be afforded by the gas heater jets 30 and 31 or by suitable electrical heating coils or by both if desired.

The principal modification of the grease receptacle 51 as compared with the receptacle 11 in the first-described embodiment is the elimination of the sediment trap from this embodiment of the invention. It has been determined that the sediment trap is not particularly related to the anti-foaming effect achieved by the invention and that omission of the trap does not change the foaming characteristics of the fryer. Another modification of the frying device in the embodiment of Fig. 5 relates to the basket means employed to suspend the food within the frying section 56 of the grease receptacle. In this instance, a pair of baskets 68 and 69 are suspended within the grease receptacle in side-by-side relation to each other. Thus, the basket 68 is located immediately above the bottom wall 62 of the grease receptacle and the basket 69 is disposed immediately above the bottom wall 63. Thus, the two baskets, considered together, have a bottom configuration which is essentially similar to the configuration of the grease receptacle 51, since the bottom walls 70 and 71 of the two baskets are also inclined at an angle of approximately 21° with respect to the horizontal when the baskets are mounted in their normal operating position. In this manner the invention is adapted for use in a cooking operation where it is desired to afford a means for frying two baskets of food in a single grease receptacle.

Fig. 6 is a cross-sectional view of a frying device 80 which represents a further embodiment of the invention and which provides for somewhat improved sediment control and also for more rapid circulation of the heated cooking fat. The frying device 80 comprises a grease receptacle 11 which may be essentially similar to the cooking fat receptacle described hereinbefore in conjunction with Fig. 1. Thus, the grease receptacle 11, as before, includes a pair of opposed vertical side walls 12 and 13 joined to additional vertical side walls such as the wall 14 and provided with suitable mounting flanges. As before, the bottom walls 22 and 23 extend downwardly and inwardly from the side walls 12 and 13, respectively, at an angle of approximately 21° with respect to the horizontal and terminate at the sediment trap 24. The gas jets 30 and 31 may be mounted beneath the bottom walls of the grease receptacle or suitable electrical heating coils may be mounted therein to heat the receptacle; this heating action may be assisted by the provision of the conductive fins 26 and 27 if desired.

In this embodiment of the invention, however, a crumb tray 81 is removably mounted within the grease receptacle 11. The configuration of the crumb tray 81 is substantially similar to that of the bottom portion or frying section 45 of the grease receptacle. Thus, the tray 81 comprises a pair of bottom walls 82 and 83 which are disposed in parallel spaced relation to the bottom walls 22 and 23 of the grease receptacle and thus are inclined at an angle B of approximately 21° with respect to the horizontal. The two bottom walls 82 and 83 are closed at the ends by vertical end walls, only one of these end walls 84 being shown in the sectional view of Fig. 6. The bottom walls 82 and 83 of the crum tray do not form a completely closed container, rather, a series of apertures 85 are formed in the two bottom walls adjacent the center of the tray, thereby affording an opening leading to the sediment trap 24 of the grease receptacle 11. Although suitable posts or other spacer devices may be utilized to maintain the crumb tray in spaced relation to the bottom of the grease receptacle, this is not necessary; rather, it is preferable that the bottom walls of the tray rest directly on the bottom walls of the receptacle, thereby affording only an extremely thin and restricted space for circulation of heated cooking fat in this area.

The cooking device 80 shown in Fig. 6 may utilize a basket 38 which is substantially similar to the basket employed in the fryer 10 illustrated in Figs. 1–4. The only change, with respect to the basket, is that in this instance the basket is supported upon the crumb tray 81 rather than upon the bottom walls of the grease receptacle 11. Consequently, in this embodiment of the invention the crumb tray 81 in effect constitutes the bottom portion of the grease receptacle. Indeed, it is not completely essential that the bottom walls 22 and 23 of the receptacle be inclined at the critical angle of 21° in those instances where the crumb tray 81 covers substantially all of the bottom of the grease receptacle, although the illustrated arrangement, in which the angle of inclination is made approximately the same for both the crumb tray and the grease receptacle, is preferred.

In operation, the frying device 80, like the fryers 10 and 50 described hereinabove, is filled with grease approximately to the top of the variable-depth frying section 45. Subsequently, when the cooking oil or other fat is heated, it tends to circulate in the fryer in the direction indicated by the arrows C. Consequently, when the fryer is in use the movement of the heated cooking oil tends to carry any small food particles and other sediment toward the central aperture 85 in the tray 81 and into the trap 24. Circulation of the heated cooking oil provides a cleaning action in the fryer and also affords some improvement in confining sediment to the trap 24. With respect to foaming action, and particularly the reduction thereof, this embodiment of the invention performs in essentially the same manner as the previously-described deep-fat fryers. Of course, the frying device 80 may employ the duel basket arrangement of Fig. 5 if desired.

Hence, while the preferred embodiments of the invention have been illustrated and described, it is to be understood that these are capable of variation and modification.

I claim:

1. A deep-fat frying device comprising: a cooking fat receptacle having a substantially vertical side wall portion and a bottom wall portion, said bottom wall portion being inclined at an angle of 18° to 23° with respect to the horizontal to form a relatively shallow fat-containing frying section of varying depth; indicator means on said receptacle for identifying an optimum upper level for said frying section closely adjacent the top of said bottom wall portion; and relatively shallow basket means, removably mounted within said receptacle and having a bottom wall portion essentially similar in configuration to the bottom wall portion of said receptacle, for suspending food within said frying section of said receptacle for frying with a minimum of foaming.

2. A deep-fat frying device comprising: a rectangular cooking fat receptacle having a substantially vertical side wall portion and a bottom wall portion, said bottom wall portion comprising two bottom walls inclined inwardly from opposed side walls at an angle of 18° to 23° with respect to the horizontal to form a relatively shallow fat-containing frying section of varying depth terminating a short distance above the junction of said bottom and side walls; a relatively shallow rectangular basket removably mounted within said frying section of said receptacle and having a bottom wall portion essentially similar in configuration to the bottom wall portion of said receptacle for suspending food within said frying section of said receptacle for frying, whereby foaming in said fryer is maintained at a minimum so long as the fat within said fryer is held to a level within said frying section.

3. A deep-fat frying device comprising: a cooking fat receptacle having a substantially vertical side wall portion and a bottom wall portion, said bottom wall portion including two bottom walls being inclined inwardly toward the center of said receptacle at an angle of 18° to 23° with respect to the horizontal to form a relatively shallow fat-containing frying section of substantially V-shaped cross-sectional configuration terminating a short distance above the junction of said bottom and side walls; and relatively shallow basket means, removably mounted in said receptacle and having a bottom wall portion essentially similar in configuration to the bottom wall portion of said receptacle, for suspending food within said frying section of said receptacle for frying, whereby foaming in said fryer is effectively minimized as long as the fat within said fryer is substantially limited in depth to said frying section.

4. A deep-fat frying device comprising: a substantially rectangular cooking fat receptacle having a side portion including four substantially vertical side walls and a bottom portion, said bottom portion including two substantially vertical end walls and two bottom walls inclined inwardly toward each other from opposed side walls at an angle of 18° to 23° with respect to the horizontal, said end and bottom walls forming a relatively shallow fat-containing frying section of varying depth; indicator means establishing an optimum maximum fat level closely adjacent the top of said bottom portion of said receptacle; a sediment trap located at the center of said bottom portion; and a relatively shallow perforate basket removably mounted in said receptacle and having a bottom portion essentially similar in configuration to the bottom portion of said receptacle, for suspending food within said frying section of said receptacle for frying with a minimum of foaming.

5. A deep-fat frying device comprising: a cooking fat receptacle having a substantially vertical side wall portion closed by a base portion having bottom walls inclined inwardly toward each other at an angle of 18° to 23° relative to the horizontal; a sediment tray removably mounted within said receptacle and having bottom walls inclined inwardly toward each other at an angle of 18° to 23° with respect to the horizontal to define a relatively shallow fat-containing frying section of varying effective depth within said receptacle and terminating at a point closely adjacent the top of said bottom walls of said sediment tray; and relatively shallow basket means, removably mounted in said receptacle within said frying section and having a bottom wall portion essentially similar in configuration to said sediment tray, for suspending food within said frying section of said receptacle for frying with a minimum of foaming.

6. A deep-fat frying device comprising: a substantially rectangular cooking fat receptacle having a substantially vertical side wall portion and a base portion, said base portion having two vertical end walls and two bottom walls inclined inwardly toward each other at an angle of 18° to 23° with respect to the horizontal to form a relatively shallow fat-containing frying section of varying depth terminating at a point closely adjacent the top of said base portion; a sediment tray removably disposed within said receptacle in spaced relation to said base portion and having a configuration essentially similar to said base portion, said tray having a central aperture located at the juncture of the inclined bottom walls thereof; a sediment trap located at the center of said receptacle immediately below said aperture; heating means for heating the inclined bottom walls to cause cooking fat to circulate from the space between said tray and said walls and back through said aperture toward said trap; and relatively shallow basket means, removably mounted in said receptacle upon said tray and having a bottom portion essentially similar in configuration to the base portion of said receptacle, for suspending food immediately above said sediment tray and within said frying section of said receptacle for frying with a minimum of foaming.

References Cited in the file of this patent

UNITED STATES PATENTS

| | | |
|---|---|---|
| 1,264,740 | Young | Apr. 30, 1918 |
| 1,994,555 | Wilson | Mar. 19, 1935 |
| 2,570,628 | Anetsberger | Oct. 9, 1951 |